United States Patent Office 3,579,543
Patented May 18, 1971

3,579,543
$\Delta^{1,3,5(10)}$-2- (OR 4-)FORMYL-3-HYDROXY-OESTRATRIENE COMPOUNDS
Max Salomon de Winter and Jan Evert Ribbers, Oss
Netherlands, assignors to Organon Inc., West Orange,
N.J.
No Drawing. Filed May 13, 1966, Ser. No. 549,786
Claims priority, application Netherlands, May 22, 1965,
6506542; Jan. 15, 1966, 6600548
Int. Cl. C07c *167/14*
U.S. Cl. 260—397.4
2 Claims

ABSTRACT OF THE DISCLOSURE $\Delta^{1,3,5(10)}$-3-hydroxy-oestratriene compounds substituted in position 2 or 4 by a formyl group, and the 3-ethers or 3-esters thereof, are prepared by reacting the 3-hydroxy-oestratriene compound with chloroform in the presence of a metal hydroxide, followed by etherification or esterification of the 3-hydroxy group. The resulting products are biologically active in decreasing the serum concentration of cholesterol and the cholesterol/phospholipid ratio, and exhibit weak estrogenic activity and osteotrophic activity.

The invention relates to a process for the manufacture of novel $\Delta^{1,3,5(10)}$-3-hydroxy-oestratriene compounds substituted in the ortho-position, and functional derivatives thereof.

More particularly the invention relates to the manufacture of novel $\Delta^{1,3,5(10)}$-3-hydroxy-oestratriene compounds substituted in position 2 or 4 by a formyl group, and 3-ethers or 3-esters thereof.

The novel compounds according to the invention may be prepared by reacting a $\Delta^{1,3,5(10)}$-3-hydroxy-oestratriene compound with chloroform in the presence of a metal hydroxide, after which the 3-hydroxyl group can be etherified or esterified, if desired, in a known manner.

The $\Delta^{1,3,5(10)}$-3-hydroxy-steroids to be applied in the process according to the invention may possess any arbitrary steric configuration elsewhere in the molecule and, as regards the substitution at carbon atom 17, belong to compounds of the androstane, pregnane, cholane, furostane or other series. The compounds may be both homo-steroids and nor-steroids including 18-nor and may further be substituted by one or more arbitrary groups, such as hydroxyl, acyloxy, oxo or alkyl groups, or halogen atoms. These substituents may already be present in the starting product or be introduced afterwards. In the latter case it may be necessary, for instance in the alkylation of a 17-keto-steroid to the corresponding 17β-hydroxy-17α-alkyl compounds, to temporarily protect the formyl group occurring in ring A, for instance by ketalisation.

The compounds according to the invention are interesting as such on account of their biological activities, particularly in decreasing the serum concentration of cholesterol and the cholesterol/phospholipid ratio, weak estrogenic activity and oesteotrophic activity, but also as intermediate products for the manufacture of other derivatives, for example steroids with a heterocyclic ring fused to ring A. An important group of final products is that of the general formula:

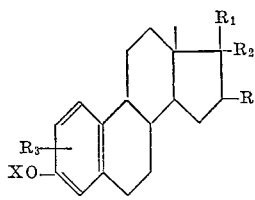

in which

X=hydrogen, an alkyl or acyl group,
Y=hydrogen, a hydroxyl, acyloxy or alkyl group, or a halogen atom,
$R_1$=a hydroxyl or acyloxy group,
$R_2$=hydrogen, or a saturated or unsaturated hydrocarbon radical with 1-6 C-atoms, or
$R_1+R_2$=a keto group and
$R_1+R_2$=a formyl group present in position 2 or 4.

The alkyl group is preferably a lower alkyl group having 1-4 carbon atoms, and the acyl group is preferably derived from an organic carboxylic acid having 1-18 carbon atoms.

The reaction according to the invention is usually performed by reacting 1 mol. of the relative steroid with 2-10 mol. of chloroform and 4-15 mol. of a metal hydroxide dissolved in as little water as possible. For preference an alkali metal hydroxide is applied.

The reaction is usually performed at a temperature of from about 50-80° C. for 1-4 hours. To the reaction mixture a solvent may possibly be added, such as an alcohol, and dimethylformamide, pyridine, or another suitable solvent.

From the thus obtained reaction mixture the two desired components, the 2-formyl and the 4-formyl-oestratriene compounds, can be isolated by a conventional method, for example by fractionated precipitation, crystallisation and/or chromatography.

Another method, more particularly useful for the preparation of the above 2-formyl-oestratrienes consists in the reaction of a $\Delta^4$-3-keto-10-formyl-steroid with an alkali metal salt of a tertiary alcohol, causing the conversion, intramolecularly, of the 10-formyl group to position 2 of the molecule, after which the thus obtained $\Delta^4$-3-keto-2-hydroxymethylene-oestrene compound is converted into the corresponding $\Delta^{1,3,5(10)}$-2-formyl-3-hydroxy-oestratriene compound by introduction of a double bond in 1,2-position chemically or microbiologically.

The starting products in the above process can be prepared by oxidizing a $\Delta^5$-3-acyloxy-steroid by conventional methods via the 5α-bromo-6β-hydroxy compound with an oxidizing metal acylate to the corresponding 6,19-oxido compound, and converting the 3-acyloxy group by hydrolysis and oxidation into the 3 keto group, followed by the splitting off of the 5-bromo substituent as HBr, for instance with pyridine, while forming a double bond between the carbon atoms 4 and 5, and finally by cleaving the 6,19-oxido ring by reaction with, for example zinc and acetic acid, to obtain the $\Delta^4$-3,19-dioxo-(10-formyl)-steroid after oxidation of the 19-hydroxy compound formed.

The starting products may belong to the androstane, pregnane, cholane, furostane or other series, and may be both homo- and nor-steroids, including 18-nor. Further they may be substituted elsewhere in the molecule by one or more alkali resistant groups. An important group of starting products are the $\Delta^4$-3,19-dioxo-streoids of the androstane or pregnane series.

The process is usually performed by dissolved the relative steroid in an organic solvent and adding this solution to a mixture of an alkali metal-t. alcoholate and the corresponding tertiary alcohol. The alkali metal is preferably potassium, and as tertiary alcohol t-butanol is preferably used. The quantity of steroid relating to the quantity of alkali metal may vary from 1:2 to 1:50 molar.

The mixture described before is stirred for some time at a certain temperature, after which the desired final product can be isolated, for example, by pouring out into acetic acid.

The reaction temperature is preferably between 10 and 50° C., and the reaction period is usually from 5 minutes to a few hours.

The thus obtained $\Delta^4$-3-keto-2-hydroxymethylene-steroids are converted into the desired $\Delta^{1,3,5(10)}$-2-formyl-3-hydroxy-oestradienes by chemical or microbiological 1,2-dehydrogenation. Chemically the 1,2-dehydrogenation may be performed by treatment with e.g. solenium dioxide; microbiologically by means of a 1,2-dehydrogenating micro-organism such as Bacillus sphaericus or Coryne bacterium simplex.

The invention is further illustrated by the following examples:

EXAMPLE 1

A solution of 3 gm. of oestrone in a mixture of 30 ml. of 1.5 N sodium hydroxide and 30 ml. of 69% ethanol is heated to 65–70° C., after which 3 ml. of chloroform are added.

In 15 minutes the reaction mixture is heated further to 75° C. and next refluxed at this temperature for 1 hour.

Then the reaction mixture is cooled down, poured out into water, acidified with 10% sulphuric acid and extracted with methylenechloride. Next the residue is chromatographed over silicagel with a mixture of benzene/ether as eluent. The fraction obtained in the eluation with benzene/ether (98:2) contained the 2- and 4-formyl-oestrone.

Crystallisation from methylenechloride/ether yielded pure 2-formyl-oestrone.

Physical constants of 2-formyl-oestrone:

Melting point: softening at 160–165° C.; melting range; 210–225° C.
Rotation: $[\alpha]_D = +151°$ (CHCl$_3$).
U.V. spectrum:

$\lambda_{max} = 268$ m$\mu$; $E_{mol} = 15,000$
$\lambda_{max} = 336$ m$\mu$; $E_{mol} = 3,900$ Crystallisation of the mother liquor from methanol yielded pure 4-formyl-oestrone; melting point 243–245° C.

EXAMPLE 2

By esterification of the 2-formyl-oestrone with acetic anhydride in pyridine the 2-formyl-oestrone-3-acetate is obtained of the following physical constants.

Melting point: 188–191° C.
Rotation: $[\alpha]_D = 143°$ (CHCl$_3$)
U.V. spectrum:
$\lambda_{max} = 261$–262 m$\mu$; $E_{mol} = 14,300$.

In the same manner the 3-esters are prepared derived from valeric acid, oenanthic acid, $\beta$-phenylpropionic acid and succinic acid.

EXAMPLE 3

In the manner as described in the Examples 1 and 2 oestradiol, 17$\alpha$-methyl-oestradiol and 17$\alpha$-ethynyl-oestradiol have been converted into the corresponding 2-, and 4-formyl derivatives, into the 3-acylates thereof derived from acetic acid, capronic acid, $\beta$-phenylpropionic acid and lauric acid, and into the corresponding 3-methyl-, and 3-ethyl ethers.

EXAMPLE 4

59 gm. of potassium were dissolved in 1200 ml. of t. butanol, to which were slowly added at room temperature and in nitrogen atomsphere a solution of 45 gm. of $\Delta^4$-3, 17,19-trioxo-androstene in 120 ml. of tetrahydrofuran. After 20 minutes the reaction mixture was pressed with nitrogen into an excess of 2 N acetic acid while cooling with ice. After that the mixture was neutralised with potassium bicarbonate and extracted with methylene chloride. The extract was washed with water, and evaporated to dryness. The residue was crystallized from methanol to obtain the $\Delta^4$-2-hydroxymethylene-3,17-diketo-oestrene (melting point 150–154° C.; $[\alpha]_D^{20} = +218°$ (c.=1; chloroform)).

3 gm. of the above compound was mixed with 2.5 gm. of chloranil in 60 ml. of dichloroethane and refluxed for one hour. After cooling and filtration the filtrate was chromatographed over silicagel and the thus obtained fraction crystallized from methylenechloride/methanol to obtain 2.15 gm. of 2-formyl-oestrone.

EXAMPLE 5

A solution of 4 gm. of $\Delta^4$-3,17,19-trioxo-androstene in 10 ml. of tetrahydrofuran were slowly added to a solution of 3 gm. of potassium in 100 ml. of t. amylalcohol at 40° C.

The processing took place by the process described in Example 4 to obtain the $\Delta^4$-2-hydroxymethylene-3,17-diketo-oestrene.

Treatment of the above compound with selenium dioxide in t-butanol yielded 2-formyl-oestrone.

EXAMPLE 6

2.3 gm. of potassium were dissolved in 100 ml. of t. amylalcohol, to which was added at room temperature and in nitrogen atomsphere a solution of 3.3 gm. of $\Delta^4$-3,19,20-trioxo-pregnene in tetrahydrofuran, after which the reaction mixture was processed by the process described in Example 4 to obtain the $\Delta^4$-2-hydroxymethylene-3,20-diketo-19-nor-pregnene in a yield of 54%.

The thus obtained 2-hydroxymethylene compound was dissolved in 250 ml. of absolute benzene to which was added at room temperatures 5.5 gm. of dichloro-dicyano-quinone. The mixture was stirred for one hour, cooled, filtrated, evaporated to a small volume and chromatographed over silicagel with benzene/ethylacetate (85:15) as eluent to yield $\Delta^{1,3,5(10)}$-2-formyl-3-hydroxy-20-keto-pregnatriene having a melting range of 148–168° C.

EXAMPLE 7

In the manner as described in the Examples 4 and 5 $\Delta^4$-3,19-dioxo-17$\beta$-hydroxy-androstene-17-benzoate was converted into 2-formyl-oestradiol-17-benzoate having a melting point of 171–173° C.

What is claimed is:

1. Process for the manufacture of $\Delta^{1,3,5(10)}$-2-formyl-3-hydroxy-oestratiene compounds comprising reacting a $\Delta^4$-3-keto-10-formyl-steroid with an alkali metal salt of a tertiary alcohol followed by 1,2-dehydrogenation of the thus obtained $\Delta^4$-3-keto-2-hydroxymethylene-oestrene compound.

2. Process according to claim 1 characterized in that for the conversion of the 10-formyl-compound into the 2-hydroxymethylene-oestrene compound as reagent is used a mixture of an alkali metal alcoholate and the corresponding tertiary alcohol.

References Cited

UNITED STATES PATENTS 2,281,622   5/1942   Ruzicka _____ 260—397.1

HENRY A. FRENCH, Primary Examiner

U.S. Cl. X.R.

260—999